United States Patent [19]
Taylor

[11] 3,838,767
[45] Oct. 1, 1974

[54] CONVEYOR TURN

[75] Inventor: Edward W. Taylor, Pico Rivera, Calif.

[73] Assignee: A. J. Bayer Company, Torrance, Calif.

[22] Filed: Oct. 27, 1972

[21] Appl. No.: 301,325

[52] U.S. Cl.................. 198/182, 198/203, 198/208, 198/181
[51] Int. Cl............................................ B65g 17/00
[58] Field of Search ........... 198/181, 182, 191, 203, 198/208, 194

[56] References Cited
UNITED STATES PATENTS

| | | | |
|---|---|---|---|
| 234,359 | 11/1880 | Waldron | 198/181 |
| 2,578,592 | 12/1951 | Pile | 198/208 |
| 3,270,863 | 9/1966 | Ackles | 198/181 |
| 3,275,126 | 9/1966 | Hartzell, Jr. | 198/208 |
| 3,561,587 | 2/1971 | Schausten | 198/182 |

FOREIGN PATENTS OR APPLICATIONS

| | | | |
|---|---|---|---|
| 142,490 | 10/1948 | Australia | 198/191 |

*Primary Examiner*—Richard A. Schacher
*Assistant Examiner*—Joseph E. Valenza
*Attorney, Agent, or Firm*—William P. Green

[57] ABSTRACT

A conveyor turn including a belt shaped and mounted in a relation forming an upper active run which moves arcuately about a predetermined location, to advance workpieces along a correspondingly arcuate path and thereby change their direction of movement, and forming also a return run desirably spaced beneath and generally parallel to the active run. The belt is preferably driven by an endless drive element which engages a series of coacting parts on the periphery of the belt in driving relation.

13 Claims, 10 Drawing Figures

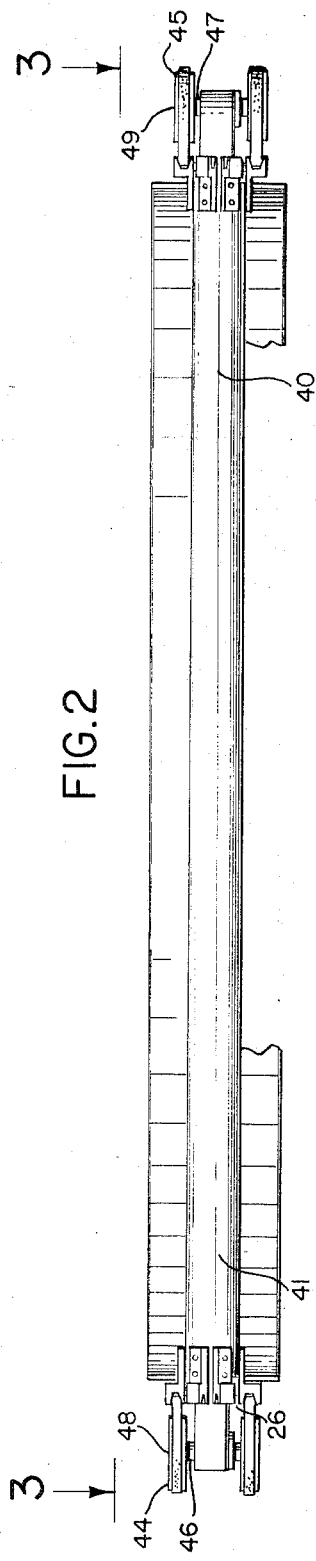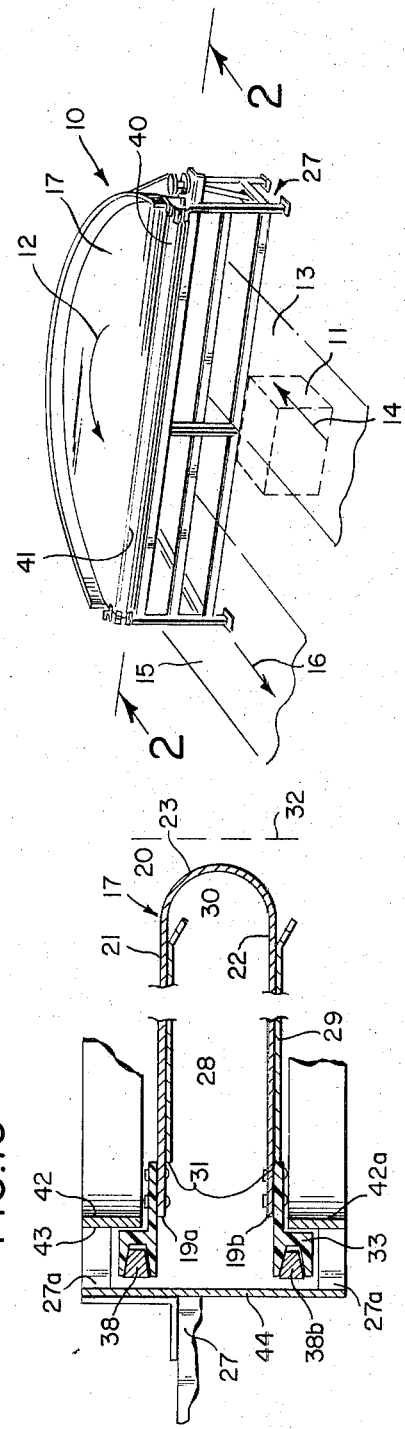

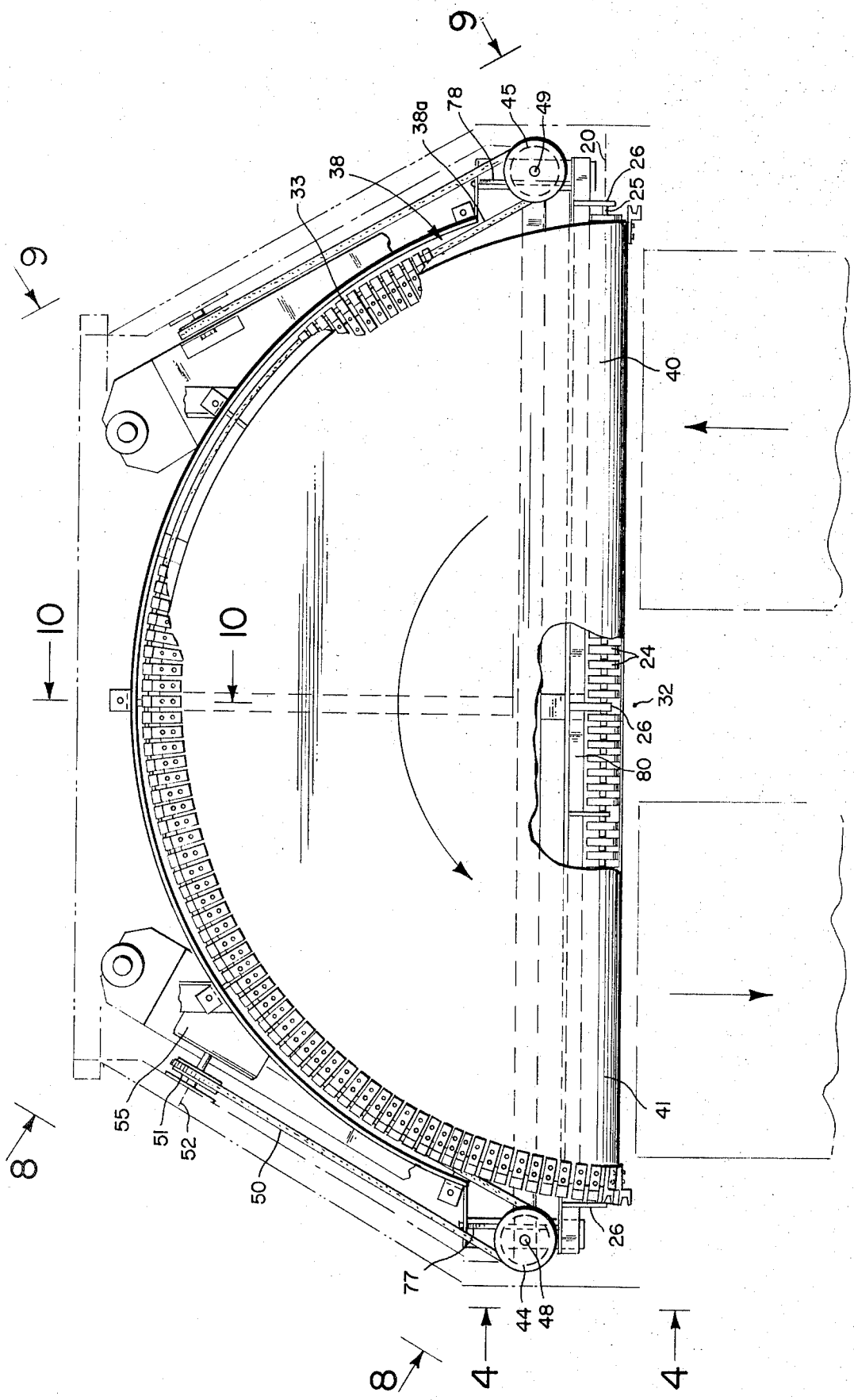

PATENTED OCT 1 1974      3,838,767

CONVEYOR TURN

BACKGROUND OF THE INVENTION

This invention relates to conveyor turns, to be utilized for changing the direction of movement of a series of workpieces advancing along a conveyor path.

The undersigned inventor has heretofore developed a unique type of conveyor turn in which a preferably circular belt is folded or doubled back on itself in a manner enabling an upper active run of the belt to move arcuately about a center location and thus advance a series of workpieces along an arcuate path changing their direction of advancement. This belt in the past has been provided near its periphery with a series of chain links, which have been engageable with a motor driven sprocket wheel in a relation moving the belt to advance the workpieces.

SUMMARY OF THE INVENTION

The present invention provides an improved drive arrangement for a conveyor turn of the above discussed general type, and in particular to a drive system which is structurally very simple, straightforward and inexpensive, and yet is reliable in maintaining an effective driving relationship between an actuating motor and the conveyor over long periods of time and with a minimum of mechanical difficulty. The main part of the drive mechanism subject to wear may be a simple endless flexible element, desirably a drive belt, which may be very easily and inexpensively replaced when worn. The apparatus may also include automatic take-up mechanism for maintaining this drive element under proper tension at all times to attain an optimum driving condition.

The drive belt or element preferably acts against the main conveyor belt during only a portion of the path of movement of the drive element, and moves out of engagement with the conveyor belt during another portion of that path of movement. For best results, the drive element acts against the active run and the inactive run of the conveyor belt along two arcuate and essentially semicircular paths, but moves out of engagement with the belt between the two runs. The actuating motor and the take-up means desirably act on the drive belt at locations at which the latter is out of engagement with the conveyor belt.

For optimum transmission of power to the main conveyor belt, that belt may carry means forming a radially outwardly projecting groove within which the drive belt or element is received in driving relation. These groove forming means may include an arcuate series of parts carried by the main conveyor belt, desirably near its periphery, and each having a radially outwardly projecting groove for receiving the drive belt, with backing means resisting radially inward movement of these parts and the periphery of the conveyor belt.

BRIEF DESCRIPTION OF THE DRAWINGS

The above and other features and objects of the invention will be better understood from the following detailed description of the typical embodiment illustrated in the accompanying drawings, in which:

FIG. 1 is a perspective view of a 180° conveyor turn formed in accordance with the invention;

FIG. 2 is an enlarged edge view taken on line 2—2 of FIG. 1;

FIG. 3 is a plan view taken primarily on line 3—3 of FIG. 2, with certain portions of the apparatus broken away to reveal parts which would otherwise be hidden;

FIG. 10 is an enlarged fragmentary section taken on line 10—10 of FIG. 3.

DESCRIPTION OF THE PREFERRED EMBODIMENT

Figure 4:
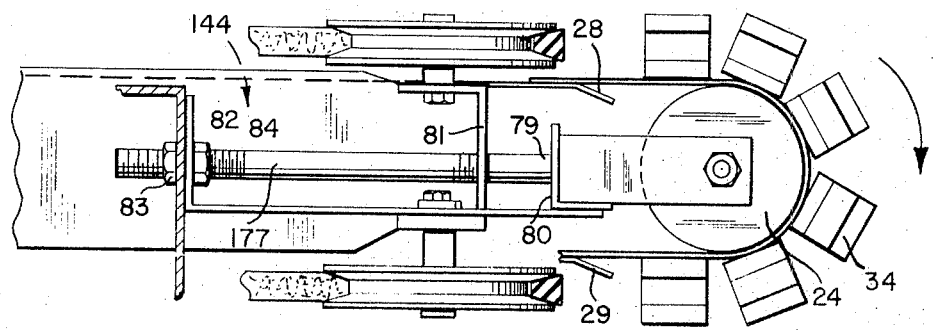
FIG. 4 is a further enlarged fragmentary side view taken on line 4—4 of FIG. 3.

Referring first to FIG. 1, I have shown generally at 10 a conveyor turn constructed in accordance with the invention, and which is adapted to move a series of workpieces 11 along a semicircular path represented by the arcuate arrow 12 of FIG. 1, to change the direction of movement of the workpieces through 180°. More particularly, the workpieces may approach the turn unit 10 on a conventional straight conveyor 13, moving in the direction of the arrow 14, and may discharge from the opposite side of the turn mechanism 10 along a second straight conveyor 15 which is parallel to the supply conveyor 13 but moves in the opposite direction as indicated by arrow 16.

Figure 5:
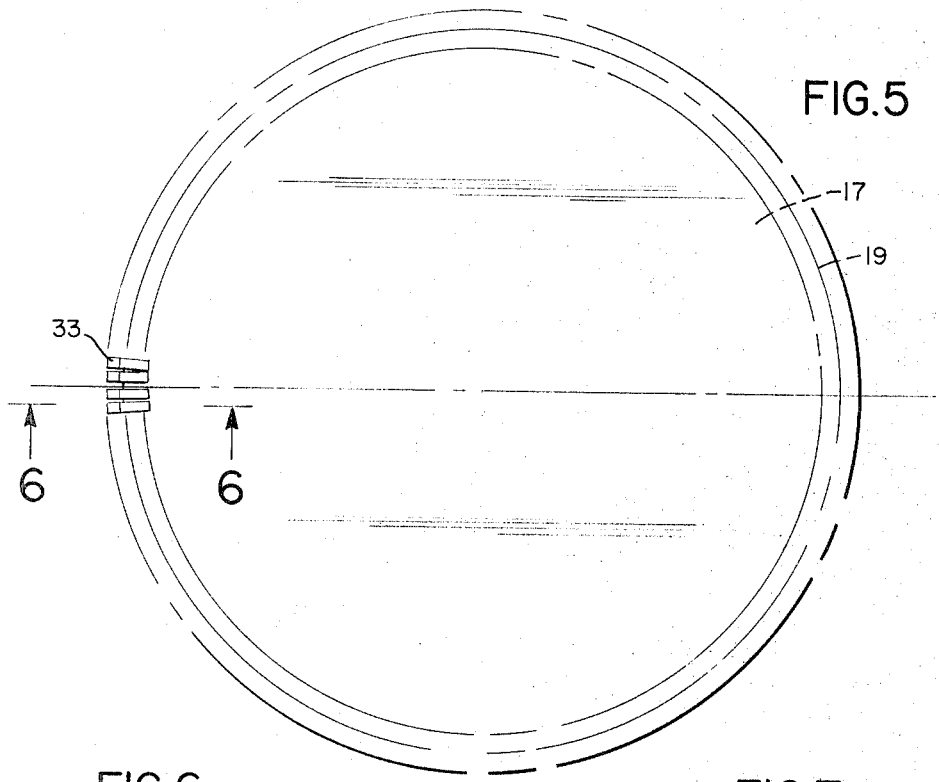
FIG. 5 is a view showing the configuration of the circular conveyor belt as it appears before being folded or doubled back in the assembled conveyor.

The conveyor turn 10 includes a flexible conveyor belt 17 which as seen in FIG. 5 is formed of a circular piece of flexible sheet material centered about an axis 18 and having a peripheral circular edge 19. Belt 17 may be formed of any convenient sheet material, such as leather, or the like. This circular belt is folded or doubled back relative to itself about a horizontal axis 20 (FIG. 10), extending generally diametrically with respect to the circular belt 17, to form a substantially semicircular upper horizontal run 21 of the belt and a correspondingly substantially semicircular and identical horizontal lower run 22 extending parallel to but spaced beneath upper run 21. The curved portion 23 between and joining theses two runs extends about a large number of individual rotatable axially very short idler rollers 24 (FIG. 3), which are mounted about a common shaft 25 for rotation about the axis 20. Shaft 25 may be appropriately mounted by a series of forwardly projecting spaced mounting elements 26 carried by an angle iron 80 which as will be discussed in greater detail at a later point may be mounted adjustably by the mechanism illustrated in FIG. 4 to a rigid stationary frame 27 of the device resting on a floor surface 28. The frame 27 also carries a semicircular horizontally extending stationary rigid support plate 28 on which the upper run 21 of belt 17 is movably supported. Similarly, the lower horizontal rigid semicircular support plate 29 may be received beneath and movably support the weight of bottom run 22 of the belt. The forward edges 30 of these plates 28 and 29 may be parallel to one another and parallel to the previously mentioned axis 20, and may be turned slightly downwardly as seen in FIG. 10, while the peripheral edges 31 of plates 28 and 29 may extend semicircularly about a vertical axis 32 which defines also the centers of the approximately semicircular peripheral edges 19a and 19b of the upper and lower runs 21 and 22 of the belt. In use, the upper active load supporting run 21 of the belt moves semicircularly about axis 32, in a generally right to left direction as viewed in FIG. 1, while the lower return run 22 moves semi-circularly in the opposite direction. The various rollers 24 at the leading edge of the conveyor rotate at different speeds corresponding to the different radial distances of these rollers from axis 32, and the consequent different rates of linear movement of the belt at the different locations of these various rollers. All of the rollers 24 are desirably of a common external diameter, but being short axially do not interfere with the necessarily different rater of linear movement of the different portions of the belt. The optimum diameter for rollers 24 is dependent upon the degree of flexibility inherent in the belt material, which flexibility dictates the minimum permissible radius around which the belt 17 can be dynamically flexed with efficiency.

Figure 6:
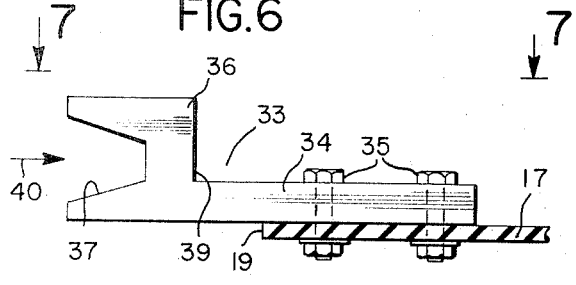
FIG. 6 is a greatly enlarged fragmentary section taken on line 6—6 of FIG. 5.
Figure 7:
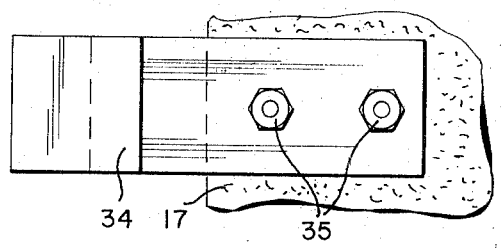
FIG. 7 is a fragmentary view taken on line 7—7 of FIG. 6.

About its circular periphery, belt 17 carries a series of elements 33, which may be identical and have the radial cross-sectional configuration illustrated in FIG. 6. More particularly, each of these elements 33 may have a mounting portion 34 secured by screws or other fasteners 35 to the peripheral portion of belt 17, and projecting radially outwardly beyond the outer circular edge 19 of the belt. Beyond that edge, each element 33 may have a vertically thickened portion 36, containing a V-shaped groove 37 which tapers radially inwardly in correspondence with the taper of an engaging flexible V-belt 38 by which conveyor belt 17 is driven. Radially inwardly of groove 37, each part 33 has a vertical shoulder 39, extending parallel to the previously mentioned vertical axis 32 of FIG. 10, and extending directly perpendicular to the radial direction 40 in which belt 38 exerts force radially inwardly toward axis 32 against part 33.

As seen best in FIG. 3, the V-belt 38 has an upper run 38a which extends approximately semicircularly about almost the entire periphery of the upper run 21 of the main conveyor belt 17, and is received within the grooves 37 of elements 33 in engaging driving relation through the major portion of the semicircular extent of run 21. The frictional engagement of run 38a of drive belt 38 with elements 33 acts to very effectively drive these elements 33 and the connected conveyor belt semicircularly from a pick-up location 40 (FIG. 3) to a discharge location 41. V-belt 38 exerts a radially inward force against elements 33 toward main axis 32 of the apparatus, which force is resisted by an essentially semicylindrical vertical back-up element 42 centered about axis 32 (see FIG. 10). This element 42 engages the shoulders 39 of elements 33, to prevent radially inward movement of those elements 33 while permitting their arcuate sliding movement along the radially outer cylindrical surface 43 of part 42. Elements 33 are desirably formed of a suitable rigid material, such as nylon, having sufficient friction with respect to the V-belt 38 to attain an effective driving action, while having a sufficiently low coefficient of friction with respect to surface 43 to enable elements 33 to slide properly along that surface. For best results, the area of engagement of each element 33 at its radially inner side with back-up part 42 has at least a portion of its surface in direct radial alignment with a portion of the outer surface of element 33 which contacts belt 38, so that part 42 can take the radial forces of belt 38 very directly and positively.

Spaced beneath and parallel to the upper approximately semicircular run 38a of V-belt 38, this drive belt has a second and lower run 38b, also approximately semicircular and centered about axis 33, and received within grooves 37 of the elements 33 of the lower run 22 of main conveyor belt 17. The inner shoulders 39 of these elements 33 of the lower run engage and bear radially inwardly against a second backing element 42a serving to permit radially inward movement of the elements 33 in the same manner discussed previously in connection with backing element 42. The two backing elements 42 and 42a are appropriately mounted in fixed positions to frame 27, as by rigid connector parts represented at 27a. An outer semicircular vertical shield element 44 may also be mounted to the frame, for shielding the outer sides of the two runs 38a and 38b of belt 38.

At the extremities of the upper run 38a of belt 38, this drive belt passes about two shieves or pulley wheels 44 and 45 (FIG. 3), which are mounted by appropriate bearings 46 and 47 (FIG. 2) to turn about spaced parallel vertical axes 48 and 49. After passing about sheave 44, the drive belt 38 extends rearwardly at 50 to pass about a sheave 51 turning about a horizontal axis 52, and to then advance downwardly about and be driven by another sheave 54 also turning about a horizontal axis and driven by a motor 55 through a reduction gear 56. The drive belt then passes about another sheave 57 turning about a horizontal axis, and then advances forwardly at 58 to pass about a sheave 59 spaced beneath and turning about the same axis of sheave 44. After passing about sheave 59, drive belt 38 commences its semicircular pass about the periphery of the lower run 22 of the conveyor belt, and then ultimately passes about a sheave 60 (FIG. 9) turning about the same axis as, and spaced beneath, the previously mentioned sheave 45. Between the sheaves 60 and 45, belt 38 advances rearwardly at 61, then about the sheaves 62, 63, and 64 turning about parallel horizontal axes, and then forwardly again at 65.

Figure 8:
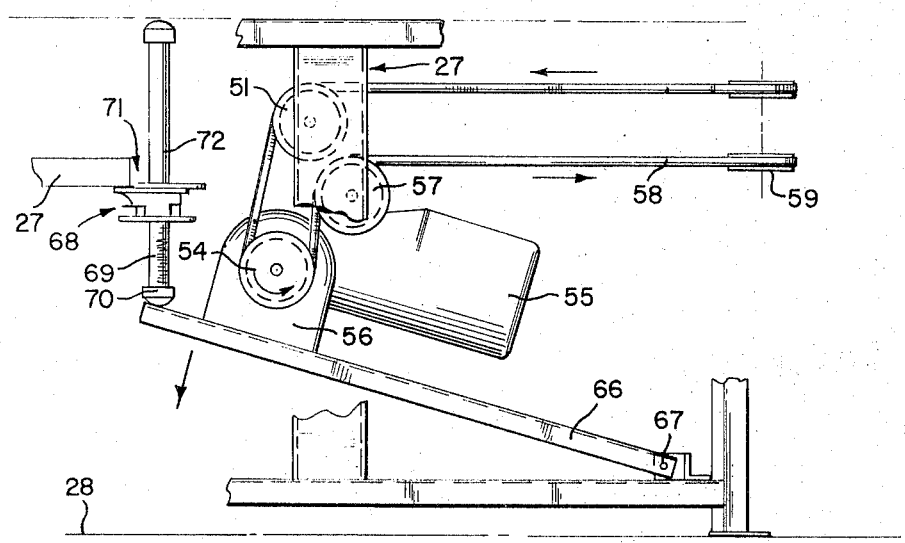
FIG. 8 is a fragmentary view taken on line 8—8 of FIG. 3.

Referring again to FIG. 8, the sheaves 51 and 57 are mounted for rotation about their individual horizontal axes at first positions relative to the frame 27, while the motor 55, reduction gear 56, and sheave 54 are free for generally upward and downward movement to take up slack in and apply tension to belt 38. To allow such movement, the parts 55, 56, and 54 are mounted on arm 66, which is pivoted to the frame at 67, and whose left end in FIG. 8 moves downwardly in response to the exertion of the force of gravity on the motor and other parts. A one-way mechanism 68 permits such downward movement, to take up slack in belt 38 and apply a predetermined tensioning force thereto, while preventing upward returning movement of the motor and connected parts. This mechanism 68 may for that purpose include a vertical extending and vertically movable rod 69, having a lower end 70 which bears against the left end of arm 66, and having a portion thereabove extending through a motion preventing unit 71 suitably attached in fixed position to frame 27. Mechanism 71 may be a conventional ratchet device, engageable with a series of ratchet teeth 72 on rod 69 in a relation permitting the desired downward movement of rod 69 without resistance while positively precluding by ratchet engagement any upward movement of rod 69. Alternatively, any other known type of device for permitting linear movement in one direction but not the opposite direction may be utilized.

Figure 9:
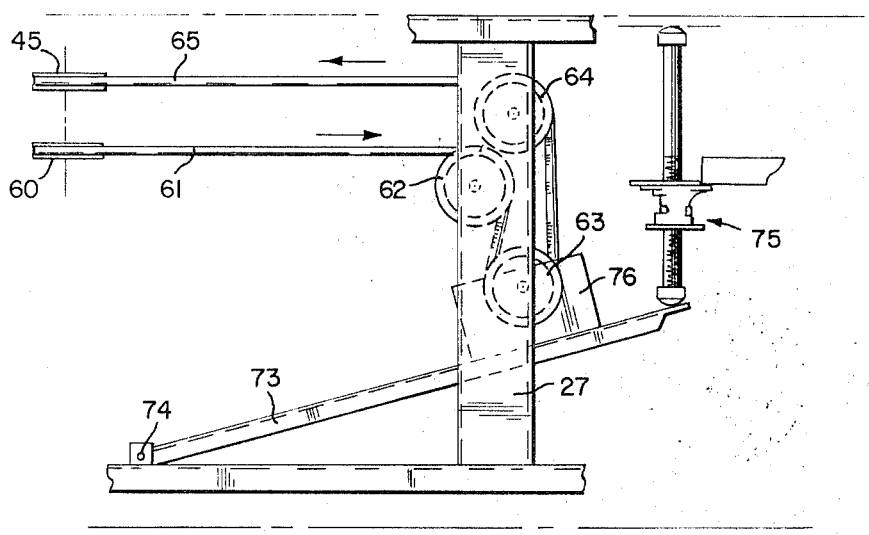
FIG. 9 is a fragmentary view taken on line 9—9 of FIG. 3.

At the opposite end of the conveyor, as seen in FIG. 9, the two rollers or sheaves 62 and 64 are, like sheaves 51 and 47, mounted to frame 27 in fixed positions, while the third sheave 63 is, like sheave 54, mounted to an arm 73 for downwardly swinging movement relative to the frame about a pivotal axis 74. A one-day mechanism 75 identical with unit 68 of FIG. 8 allows downward movement of arm 73 and the carried sheave 63, under the influence of a weight 76 carried by arm 73, while preventing upward movement of sheave 63 and the connected parts, so that a predetermined gravity induced back-up tensioning force is applied by sheave 63, as by the previously discussed sheave 54, to assist in maintaining the desired tension on the drive belt.

An appropriate tensioning force may also be exerted on the main conveyor belt 17, typically by two adjustable roller mounting mechanisms one of which is illustrated at 177 in FIG. 4. These mechanisms may include two parallel horizontal externally threaded adjusting screws or rods 77 and 78, whose forward ends are connected at 79 to the opposite ends of the previously mentioned elongated horizontal angle iron 80, to which the elements 26 mounting shaft 25 of rollers 24 are rigidly connected. These adjusting screws 77 and 78 extend rearwardly through openings in a vertical frame element 81 to which sheaves 44, 45, 59, and 60 are mounted rotatably, and through two rear vertical frame elements 82 which may be suitably welded or otherwise secured together. Two lock nuts 83 and 84 at opposite sides of the plates 82 can be utilized to shift each of the rods 77 and 78 forwardly or rearwardly to any desired adjusted positions, to thus move rollers 24 to positions in which they maintain the upper and lower runs 21 and 22 of the main belt 17 in sufficiently taut condition to properly support the workpieces, and to hold shoulders 39 of elements 33 tightly against backing parts 42 and 42a.

To now describe the manner of use of the conveyor turn 10, assume that workpieces 14 are being advanced along conveyor 13 of FIG. 1 toward the pick-up location 40, defined by the right half of the upper run of conveyor 17 in FIG. 1. This upper run moves semicircularly (in FIG. 3) from the location 40 to the discharge location 41, for delivery of workpieces onto the discharge conveyor 15. This movement of the upper run is effected by motor 55, which acts through drive belt 38 to apply counterclockwise driving force to the upper run of conveyor 17 (as viewed in FIG. 3), and to apply opposite clockwise driving force to the lower run of the main conveyor 17. As the material of the main belt 17 reaches the discharge location 41, it curves downwardly about some of the rollers 24 and thus reverses its direction of arcuate movement, for returning movement of the lower run 22 toward pick-up location 40. At that location belt 17 curves upwardly about the forward sides of others of the rollers 24 and into position to engage and drive additional workpieces.

While certain specific embodiments of the present invention have been disclosed as typcial, the invention is of course not limited to these particular forms, but rather is applicable broadly to all such variations as fall within the scope of the appended claims.

I claim:

1. A conveyor turn comprising a belt shaped and mounted to form an active run which is adapted to support a workpiece and moves essentially arcuately about a central location from a pick-up end of the run to a discharge end of the run to thereby change the direction of movement of the workpiece, said belt forming a return run mounted to return from said discharge end of the active run back to said pick-up end thereof; drive means secured to said belt to move with and drive it; a power driven endless flexible element moving along an endless path and engaging said drive means on said belt along a predetermined portion of said path and in a relation to advance the workpiece, said endless element advancing out of driving engagement with the belt along another predetermined portion of the endless path of said element; said belt being formed of an essentially circular piece of flexible material and having said return run doubled back beneath and generally parallel to said active run, so that each of said runs is substantially semicircular to change the direction of movement of said workpiece through essentially 180°; said drive means on the belt including an arcuate series of parts connected to the belt near its periphery and having aligned radially outwardly projecting grooves; said endless element being an endless flexible drive belt received within said grooves of said parts in driving relation and exerting radially inward force against said parts; said drive belt extending essentially semicircularly about the periphery of said active run and within said grooves and extending essentially semicircularly about the periphery of said return run within said grooves; a backing structure along which said parts are movable and against which said parts are engageable radially inwardly to resist radially inward movement of the parts, said drive belt extending out of engagement with said parts at said pick-up and discharge ends of said active run; a motor engaging and driving said drive belt at a location at which it is out of driving engagement with said parts and advancing from one of said runs to the other, said motor having a pulley wheel engaging said endless drive belt in driving relation; said motor being mounted for movement downwardly by gravity in a relation taking up slack in said drive belt; an additional pulley wheel engaging said drive belt at an opposite end of said active run and at a location in which said drive belt is not in engagement with said parts and is advancing from one of said runs to the other; said additional wheel being mounted for movement downwardly by gravity in a relation taking up slack in said belt; and means permitting downwardly but not upward movement of said motor and said additional wheel.

2. A conveyor turn comprising a belt shaped and mounted to form an active upper run which is adapted to support a workpiece and moves essentially arcuately about a central location from a pick-up end of the run to a discharge end thereof, in a relation changing the direction of movement of the workpiece; said belt forming a lower return run doubled back beneath said upper run and returning essentially arcuately about said central location from said discharge end of the upper run back to said pick-up end thereof; an arcuate series of drive lugs carried by said belt along essentially a radially outer edge thereof at positions to advance arcuately about said central location as the belt advances and having aligned grooves facing and opening in a generally horizontal direction generally radially outwardly away from said central location; an endless flexible element moving along an endless path and having a portion which advances arcuately about said central location near said radially outer edge of said belt and is received at least partially within said radially outwardly facing grooves and exerts force against said drive lugs in a direction generally radially inwardly toward said central location; motor means driving said endless element along said path; and a backing structure extending essentially arcuately about said central location near said radially outer edge of said belt and having a surface facing generally radially outwardly away from said central location and taking forces exerted radially inwardly toward said central location by said drive lugs to resist radially inward displacement of said drive lugs by said endless element.

3. A conveyor turn as recited in claim 2, in which said endless flexible element is directed out of engagement with said drive lugs along a predetermined portion of the endless path of said flexible element, and is driven by said motor means at said portion of the path at which said flexible element is out of engagement with said lugs.

4. A conveyor turn as recited in claim 2, in which said endless flexible element engages said drive lugs essentially arcuately along a major portion of said active run of said belt, and moves out of engagement with said lugs near the end of said active run.

5. A conveyor turn as recited in claim 2, in which said endless flexible element engages said drive lugs essentially arcuately along the periphery of both said active run and said return run of said belt, and moves out of engagement with said lugs between said runs.

6. A conveyor turn as recited in claim 2, in which said endless flexible element engages said drive lugs essentially arcuately along the periphery of both said active run and said return run of said belt, and moves out of engagement with said lugs and is driven by said motor means between said two runs.

7. A conveyor turn as recited in claim 2, in which said endless flexible element in advancing arcuately about said central location follows a first arcuate portion of said endless path, and beyond that portion moves out of engagement with said lugs and along a portion of said path which advances essentially tangentially with respect to said arcuate portion thereof and then returns essentially tangentially into engagement with said lugs at said lower run of the belt.

8. A conveyor turn as recited in claim 2, in which said endless flexible element engages said lugs along essentially semicircular portions of said endless path in advancing along the periphery of said active and return runs, and in extending between said runs moves out of engagement with said lugs and then back into engagement therewith along portions of said endless path which advance essentially tangentially with respect to said semicircular portions.

9. A conveyor as recited in claim 8, in which said motor means has a drive wheel engaging and driving said belt at the location of one of said tangential portions of said endless path, and is movable downwardly by gravity in a relation maintaining said flexible element under tension.

10. A conveyor turn as recited in claim 9, including an idler wheel engaging said endless flexible element at the location of the second of said tangential portions of said path, and urged downwardly by gravity in a relation taking up slack in said flexible element.

11. A conveyor turn as recited in claim 10, including one mechanisms permitting downward but not upward movement of said motor and said idler wheel.

12. A conveyor turn as recited in claim 2, in which said endless element advances out of driving engagement with said lugs along a predetermined portion of said endless path of said element, there being a wheel engaging said endless element at a location at which it is out of engagement with said lugs and which is mounted for movement downwardly by gravity in a manner taking up slack in said endless element, there being means permitting movement of said wheel downwardly but not in the reverse upward direction.

13. A conveyor turn comprising a belt shaped and mounted to form an active upper run which is adapted to support a workpiece and moves essentially arcuately about a central location from a pick-up end of the run to a discharge end thereof, in a relation changing the direction of movement of the workpiece; said belt forming a lower return run doubled back beneath said upper run and returning essentially arcuately about said central location from said discharge end of said upper run back to said pick-up end thereof; drive means carried by said belt along essentially a radially outer edge thereof and advancing arcuately about said central location as the belt advances and having groove means facing and opening in a generally horizontal direction generally radially outwardly away from said central location; an endless flexible element moving along an endless path and having a portion which advances arcuately about said central location near said radially outer edge of said belt and is received at least partially within said groove means and exerts force against said drive means in a direction generally radially inwardly toward said central location; motor means driving said endless element along said path; and a backing structure extending essentially arcuately about said central location near said radially outer edge of said belt and having a surface facing generally radially outwardly away from said central location and taking forces exerted radially inwardly toward said central location by said drive means to resist radially inward displacement of said drive means by said endless element.

* * * * *